United States Patent
Zhu

(10) Patent No.: US 7,746,395 B2
(45) Date of Patent: Jun. 29, 2010

(54) COLOR INTERPOLATION METHODS FOR CORRECTING OUTLYING VALUES

(75) Inventor: Ziyu Zhu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 605 days.

(21) Appl. No.: 11/644,385

(22) Filed: Dec. 21, 2006

(65) Prior Publication Data

US 2007/0139537 A1 Jun. 21, 2007

(30) Foreign Application Priority Data

Dec. 21, 2005 (CN) .......................... 2005 1 0022410

(51) Int. Cl.
*H04N 3/14* (2006.01)
*H04N 5/335* (2006.01)
*H04N 9/04* (2006.01)
*H04N 9/83* (2006.01)

(52) U.S. Cl. .................................... 348/272; 348/222.1

(58) Field of Classification Search .............. 348/222.1, 348/246–251, 272, 273, 280
See application file for complete search history.

(56) References Cited

U.S. PATENT DOCUMENTS

| 7,034,874 | B1 * | 4/2006 | Reinhart et al. | 348/246 |
| 2003/0052981 | A1 * | 3/2003 | Kakarala et al. | 348/272 |
| 2004/0051798 | A1 * | 3/2004 | Kakarala et al. | 348/246 |
| 2005/0231607 | A1 * | 10/2005 | Kwon et al. | 348/222.1 |
| 2006/0176375 | A1 * | 8/2006 | Hwang et al. | 348/222.1 |

* cited by examiner

*Primary Examiner*—Gevell Selby
(74) *Attorney, Agent, or Firm*—Venture Pacific Law, PC

(57) ABSTRACT

This invention of a color interpolation method for correcting color values of an image, comprising the steps of: constructing a color interpolation matrix having a plurality of points and a center point as an interpolation point, where each point being expressed by one known color and two unknown colors; correcting the known color value of the center point as a function of the color values of the center point and the points in the matrix having the same known color; choosing the horizontal direction or the vertical direction with respect to the center point as the benchmark direction for interpolation calculation; and interpolating one or more unknown color values of the center point as a function of the known color values of the points in the benchmark direction and the known color value of the center point.

3 Claims, 5 Drawing Sheets

|  $B_{11}$ | $G_{12}$ | $B_{13}$ | $G_{14}$ | $B_{15}$ |
|---|---|---|---|---|
| $G_{21}$ | $R_{22}$ | $G_{23}$ | $R_{24}$ | $G_{25}$ |
| $B_{31}$ | $G_{32}$ | $B_{33}$ | $G_{34}$ | $B_{35}$ |
| $G_{41}$ | $R_{42}$ | $G_{43}$ | $R_{44}$ | $G_{45}$ |
| $B_{51}$ | $G_{52}$ | $B_{53}$ | $G_{54}$ | $B_{55}$ |

Figure 1

| $G_{11}$ | $B_{12}$ | $G_{13}$ | $B_{14}$ | $G_{15}$ |
|---|---|---|---|---|
| $R_{21}$ | $G_{22}$ | $R_{23}$ | $G_{24}$ | $R_{25}$ |
| $G_{31}$ | $B_{32}$ | $G_{33}$ | $B_{34}$ | $G_{35}$ |
| $R_{41}$ | $G_{42}$ | $R_{43}$ | $G_{44}$ | $R_{45}$ |
| $G_{51}$ | $B_{52}$ | $G_{53}$ | $B_{54}$ | $G_{55}$ |

Figure 2

| $G_{11}$ | $R_{12}$ | $G_{13}$ | $R_{14}$ | $G_{15}$ |
|---|---|---|---|---|
| $B_{21}$ | $G_{22}$ | $B_{23}$ | $G_{24}$ | $B_{25}$ |
| $G_{31}$ | $R_{32}$ | $G_{33}$ | $R_{34}$ | $G_{35}$ |
| $B_{41}$ | $G_{42}$ | $B_{43}$ | $G_{44}$ | $B_{45}$ |
| $G_{51}$ | $R_{52}$ | $G_{53}$ | $R_{54}$ | $G_{55}$ |

Figure 3

|       |       |       |       |       |
|-------|-------|-------|-------|-------|
| $R_{11}$ | $G_{12}$ | $R_{13}$ | $G_{14}$ | $R_{15}$ |
| $G_{21}$ | $B_{22}$ | $G_{23}$ | $B_{24}$ | $G_{25}$ |
| $R_{31}$ | $G_{32}$ | $R_{33}$ | $G_{34}$ | $R_{35}$ |
| $G_{41}$ | $B_{42}$ | $G_{43}$ | $B_{44}$ | $G_{45}$ |
| $R_{51}$ | $G_{52}$ | $R_{53}$ | $G_{54}$ | $R_{55}$ |

Figure 4

COLOR INTERPOLATION METHODS FOR CORRECTING OUTLYING VALUES

CROSS REFERENCE

This application claims priority from a Chinese patent application entitled the following Chinese patent applications: "Color Interpolation Methods for Correcting Outlying Values" filed on Dec. 21, 2005, having a Chinese Application No. 200510022410.7. The above application is incorporated herein by reference.

FIELD OF INVENTION

This invention involves color interpolation methods, and especially, in digital image processing, in obtaining Bayer matrix correction in correcting abnormal points and simultaneously interpolating colors in digital image processing.

BACKGROUND

In digital image processing, the image resulting from a Bayer color matrix must undergo color interpolation to restore the color of the image. Past methods generally used relationships of space or color to interpolate and restore color points. However, by these methods, abnormal points (also called outlying points) in the Bayer matrix would affect the interpolation of surrounding points, strongly influencing the effectiveness of the color interpolation. In addition, using any single method often resulted in the image having unclear edges or having false colors in the detail markups. These all have undesirable effects on color interpolation.

SUMMARY OF INVENTION

An object of this invention is to provide a color interpolation method that can correct outliers in an image and increase image quality.

Briefly, objects of this invention can accomplished by A color interpolation method for correcting color values of an image, comprising the steps of: constructing a color interpolation matrix having a plurality of points and a center point as an interpolation point, where each point being expressed by one known color and two unknown colors; correcting the known color value of the center point as a function of the color values of the center point and the points in the matrix having the same known color; choosing the horizontal direction or the vertical direction with respect to the center point as the benchmark direction for interpolation calculation; and interpolating one or more unknown color values of the center point as a function of the known color values of the points in the benchmark direction and the known color value of the center point.

Compared with existing techniques, this invention has the following advantages: methods of the present invention can remove outliers in an image, preventing the spreading of abnormal/outlying color values in the matrix, allowing image details to be more true/authentic, making colors more realistic and vivid, strengthening the edges of an image to be more distinct, and preventing the emergence of false colors.

DESCRIPTION OF THE DRAWINGS

The foregoing and other objects, aspects and advantages of the invention will be better understood from the following detailed description of the preferred embodiments of this invention when taken in conjunction with the accompanying drawings in which:

FIGS. 1 and 4 are Bayer matrices with blue center points.
FIGS. 2 and 3 are Bayer matrices with green center points.

DETAILED DESCRIPTIONS OF THE PREFERRED EMBODIMENTS

Figure 5:
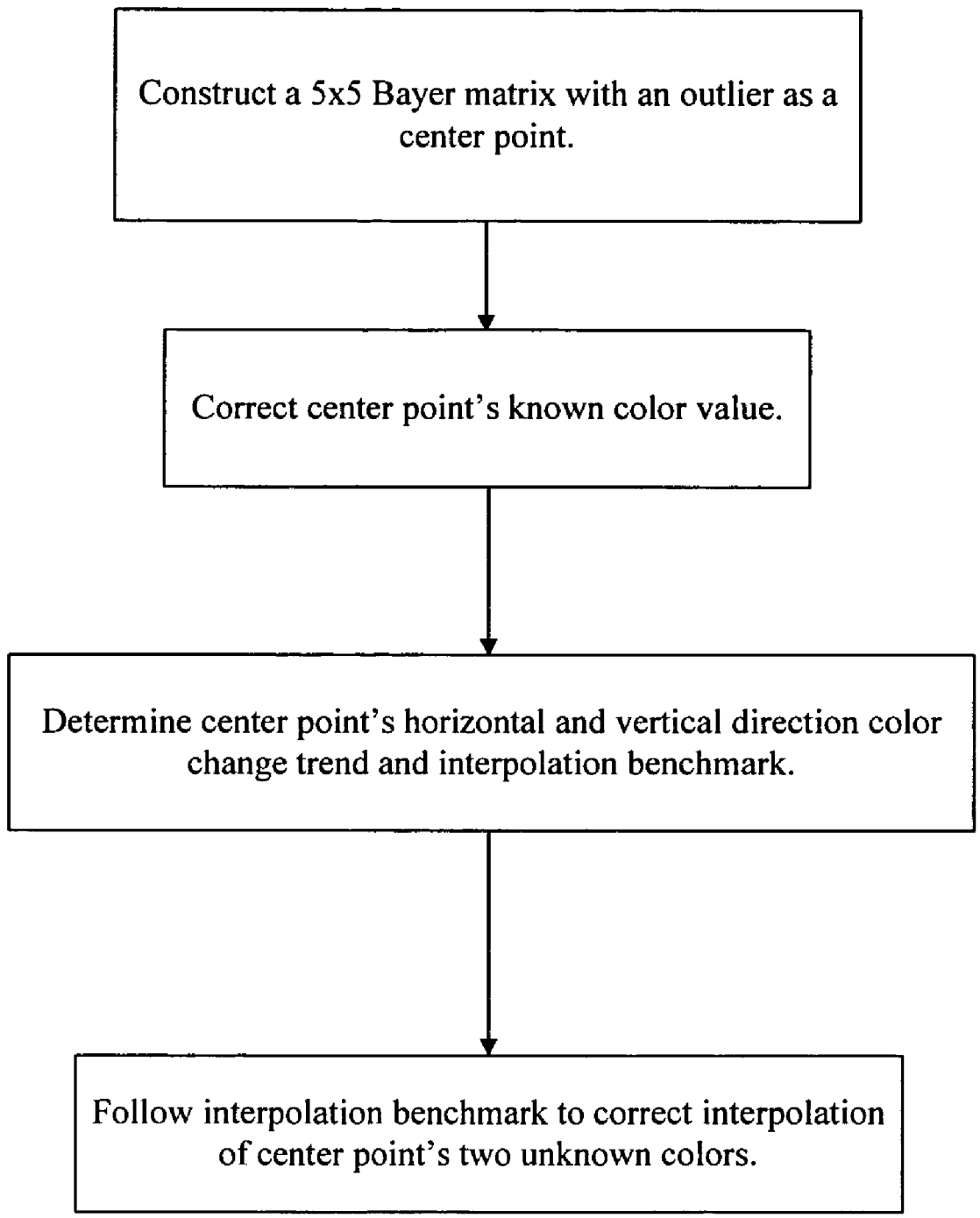
FIG. 5 is a flow chart for one method of this invention.

Objects of this invention can accomplished by correction of the value of outliers via a color interpolation method that includes the following steps:

1) Step for constructing a color interpolation matrix. With the interpolation point as the center point, construct a 5×5 Bayer matrix. Each point is expressed by one known color and two unknown colors, where the three colors being red (R), green (G) and blue (B) and the known color of the center point being R or B.

2) Step for correcting the known color value of the center point. Based on the difference between the color values of the center point and points in the matrix having the same known color, correcting the known color value of the center point.

3) Step for determining the benchmark. Determining the trend of the color change in the horizontal direction and in the vertical direction with respect to the center point; and choosing the horizontal direction or the vertical direction as the benchmark direction for the interpolation calculation.

4) Step for interpolating the value of the center point's two unknown colors. The average value of the known color values of the points in the benchmark direction is used as the estimated value of the unknown color of the center point, and using the difference between the known color values of the two points in the benchmark direction and the known color value of the center point to correct the estimated value and to interpolate the two unknown color values of the center point.

In step 2, the principle for performing the correction is as follows: If the value of the center point's known color value is larger or smaller by a set value than those of the surrounding points having the same color, replacing the center point's known color value with the average of the surrounding points' known color values; otherwise, keeping the center point's known color value.

This color interpolation method which corrects the value of outliers includes the following steps:

1) Step for constructing a color interpolation Bayer matrix. With the interpolation point as the center point, constructing a 5×5 Bayer matrix. All points are expressed by one known color and two unknown colors; the three colors being R, G and B and the known color of the center point being G.

2) Step for correcting the known color value of the center point. Correcting the known color value of the center point based on the difference between it and the points with the same known color in the matrix.

3) Step for correcting the values of the known colors of the points surrounding the center point. Correcting the values of the known colors of the two points surrounding the center point whose known color is B and the two points surrounding the center point whose known color is R.

4) Step for interpolating the two unknown color values of the center point. Using the average corrected known color values of the two surrounding points whose known colors are R or B as the estimated R and B values of the center point; using the difference in value between the center point's known color value and the surrounding points' known colors' color values to correct the center point's estimated value to obtain the R value and B value of the center point.

In steps 2 and 3, the principle for the correction is as follows: If the known color value of a certain point is larger than that of the known color values of the surrounding points by a set value, and the average of the surrounding points' known color values is also larger than that set value, then substituting such average value of the surrounding point as the known color value of that certain point. Otherwise, keep that certain point's known color value.

Referring to FIGS. 1 to 5, one type of color interpolation method employed by this invention uses a 5×5 Bayer matrix to correct the value of outliers. The said matrix covers two types of situations: 1) the know color of the center point is blue (as shown in FIG. 1) or red (as shown in FIG. 4), and the locations of the green points are the same; 2) the known color of the center point is green, and the locations of the blue and red points are interchangeable, as shown in FIGS. 2 and 3.

For the first situation, the steps of the interpolation method are:

1) Step for constructing a color interpolation matrix. With the interpolation point as the center point, constructing a 5×5 Bayer matrix, with each point expressed by one known and two unknown colors; the three colors being red (R), green (G) and blue (B), and the known color of the center point being R or B;

2) Step for correcting the value of the center point's known color. Based on the difference between the value of the center point's known color and the value of the same known color points in the matrix, correcting the value of the center point's known color.

3) Step for determining the benchmark. Determining the trend of color change in the horizontal direction and in the vertical direction with respect to the center point; and choosing the horizontal direction or the vertical direction from the center point as the benchmark for the interpolation calculation.

4) Step for interpolating the value of the center point's two unknown colors. The average value of the known color values of the points in the benchmark direction is used as the estimated value of the unknown color of the center point, and using the difference between the known color values of the two points in the benchmark direction and the known color value of the center point to correct the estimated value and to interpolate the two unknown color values of the center point.

In step 2, the principle for performing the correction is as follows: If the known color value of the center point is larger or smaller than that of all the points with the same known color by a set value (Th), then consider this point an outlier and replace the known color value of this point with the average value of the surrounding points' known color values. Otherwise, the center point's known color value is kept. The specific correction process is as follows:

$$Ra = \tfrac{1}{8} * (R11 + R13 + R15 + R31 + R35 + R51 + R53 + R55);$$

$$Rb = R33 + Th;$$

$$Rs = R33 - Th;$$

If R11>Rb, R13>Rb, R15>Rb, R31>Rb, R35>Rb, R51>Rb, R53>Rb, R55>Rb are all true, or R11<Rs, R13<Rs, R15<Rs, R31<Rs, R35<Rs, R51<Rs, R53<Rs, R55<Rs are all true, then R33=Ra. Otherwise, R33=R33.

After correcting point R33, the two parameters H1 and V1 can be calculated:

$$H1 = |G32 - G34| + |R33 - R31 + R33 - R35|$$

$$V1 = |G23 - G43| + |R33 - R13 + R33 - R53|$$

The above described parameters H1 and V1 describe the color change trends in the horizontal direction and in the vertical direction from the center point in two respects: the differences in value of the neighboring green points in the horizontal and vertical direction are |G32−G34| and |G23−G43|; and the differences in value between the center point's actual red color value R33 and neighboring horizontal and vertical points are (R31+R35)/2 and (R13+R53)/2 (in relation to color brightness, green's contribution is the largest; the difference in green is in a much greater proportion than the difference in red). The changes in the color values in the direction having smaller parameter changes are more realistic in indicating the change in brightness. Therefore, the smaller changes in brightness of the color values can be used to adjust the color value(s) during interpolation.

Based on the above described logic, in situations as in FIG. 4 where the center point is red, interpolation of G33 and B33 is as follows:

If H1<V1:

$$G33 = \tfrac{1}{2} * (G32 + G34) + \tfrac{1}{4} * (R33 - R31 + R33 - R35);$$

$$B33 = \tfrac{1}{4} * (B22 + B24 + B42 + B44) + \tfrac{1}{4} * (R33 - \tfrac{1}{2} * (R13 + R53) + \tfrac{1}{2} * (G32 + G34) - \tfrac{1}{2} * (G23 + G43));$$

If H1>V1:

$$G33 = \tfrac{1}{2} * (G23 + G43) + \tfrac{1}{4} * (R33 - R13 + R33 - R53);$$

$$B33 = \tfrac{1}{4} * (B22 + B24 + B42 + B44) + \tfrac{1}{4} * (R33 - \tfrac{1}{2} * (R31 + R35) + \tfrac{1}{2} * (G23 + G43) - \tfrac{1}{2} * (G32 + G34));$$

If H1=V1:

$$G33 = \tfrac{1}{4} * (G32 + G34 + G23 + G43) + \tfrac{1}{8} * (R33 - R31 + R33 - R35 + R33 - R13 + R33 R53);$$

$$B33 = \tfrac{1}{4} * (B22 + B24 + B42 + B44) + \tfrac{1}{8} * (R33 - R31 + R33 R35 + R33 - R13 + R33 - R53);$$

In the above mentioned interpolation method, interpolation of G33 and B33 uses the known color values having smaller changes in brightness to interpolate unknown color values, includes two parts: estimating using the average value of known colors of neighboring points in the horizontal direction and vertical direction having smaller changes in brightness and correcting the estimate using the difference in value between known colors of neighboring points having smaller changes in brightness and the center point to arrive at a color interpolation that is closer to the true colors. In interpolating B33 and G33, since green contributes the most to color brightness, the difference in green would have a much greater proportion than the difference in red. Therefore, during interpolation, one must take into account green's deviation in horizontal and vertical directions.

For the second situation, the interpolation method steps are:

1) Step for constructing a color interpolation Bayer matrix. With the interpolation point as the center point, constructing a 5×5 Bayer matrix with each point expressed by one known and two unknown colors; the three colors being red (R), green (G) and blue (B) and the known color of the center point being G.

2) Step for correcting the value of the center point's known color. Correcting the known color value of the center point base on the difference between the known color value of the center point and the points with the same known color in the matrix.

3) Step for correcting the values of the known colors of points surrounding the center point. Correcting the values of the known colors of the two points surrounding the center point whose known color is B and the two points surrounding the center point whose known color is R.

4) Step for interpolating the value of the two unknown colors of the center point. Using the average corrected known color values of the two surrounding points whose known color is R or B as the estimated values for R and B of the center point. Using the difference in value between the known color value of the center point and the known color values of the surrounding points to correct the estimated B and R values of the center point.

Referring to FIG. 3, in step 2, the principle for correction is as follows: if the difference in value between G33's known color value(s) and the values of the same known colors of the surrounding eight points is greater than a parameter Th, and the difference in value between G33's known color value(s) and the average values of these eight points' known color values is greater than Th, then G33 is considered as an outlier and G33's known color value(s) is replaced with the average values of the known color values of the eight points. The calculation process is as follows:

$$Ga = \frac{1}{8} * (G13 + G22 + G24 + G31 + G35 + G42 + G44 + G53);$$

If $|G33-G13|>Th$, $|G33-G22>Th$, $|G33-G24|>Th$, $|G33-G31|>Th$, $|G33-G35|>Th$, $|G33-G42|>Th$, $|G33-G44|>Th$, $|G33-G53|>Th$ and $|G33-Ga|>Th$, then $G33=Ga$.

After correcting G33, as there are only two reference points to interpolate R33 (or B33), to reduce the influence of outliers in these reference points, correct R32 and R34 (reference points for R33) and B23 and B43 (reference points for B33) using the same correction method as in correcting R33 (or B33). The reference points with the same known color surrounding R32 are R12, R14, R34, R52 and R54. For R34, they are R12, R14, R32, R52 and R54. For B23, they are B21, B25, B41, B43 and B45. For B43, they are B21, B23, B25, B41 and B45. Consider the location relationship of every point and the correction point. The importance of each point is slightly different. The weighted average formula is as follows:

$$Ral = \frac{1}{8} * (2*R12 + R14 + 2*R34 + 2*R52 + R54)$$

$$Rar = \frac{1}{8} * (R12 + 2*R14 + 2*R32 + R52 + 2*R54)$$

$$Bau = \frac{1}{8} * (2*R21 + 2*R25 + R41 + 2*R43 + R45)$$

$$Bad = \frac{1}{8} * (R21 + 2*R23 + R25 + 2*R41 + 2*R45)$$

Use the same principle as for correcting G33: If the difference in color value between R32 (or R34, B23 or B43) and the surrounding five points with the same known color is greater than Th, and the difference in value between R32's (or R34, B23 or B43) known color and the average value of the five points' known color is greater than Th, then consider R32 (or R34, B23 or B43) an outlier and replace G33's known color value with the weighted average value of the five points' known color. Otherwise, use the original value.

After correcting the four points as described above, non-outlier reference points can be obtained and used for interpolation. Interpolation can use these basic points as reference estimates. Green points are used to compensate the correction method. The interpolation formula is as follows:

$$R33 = \frac{1}{2} * (R32 + R34) + \frac{1}{4} * (G33 - Rl + G33 - Rr)$$

$$B33 = \frac{1}{2} * (B23 + B43) + \frac{1}{4} * (G33 - Bu + G33 - Bd);$$

Where:

$$Rl = \frac{1}{4} * (G33 + G31 + G22 + G42);$$

$$Rr = \frac{1}{4} * (G33 + G35 + G24 + G44);$$

$$Bu = \frac{1}{4} * (G33 + G13 + G22 + G24);$$

$$Bd = \frac{1}{4} * (G33 + G53 + G42 + G44);$$

From the above formula it can be seen, similarly, the interpolation estimate is split into two parts. One estimate comes from the average value of two neighboring points. Then use the difference in green color value between the center point and neighboring green points to correct and obtain the final color interpolation.

Use other interpolation methods as above with green as the center point, but exchanging the locations of red and blue points will do.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but also all those other and further alterations and modifications as would be apparent to those of ordinary skilled in the art.

I claim:

1. A color interpolation method for correcting color values of an image, comprising the steps of:
   constructing a color interpolation matrix having a plurality of points and a center point as an interpolation point, wherein each point being expressed by one known color and two unknown colors, wherein the known color of the center point being G;
   correcting the known color value of the center point as a function of the known color value of the center point and the points in the matrix having the same known color;
   correcting the value of known colors of the points surrounding the center point as a function of the two points with B as the known color and the two points with R as the known color; and
   interpolating the two unknown color values of the center point as a function of the color values of the surrounding points with the known R or B colors and the known color value of the center point;
   wherein for the two correcting steps, if the known color value of a certain point is larger than that of the surrounding points by a set value and the difference between the known color value and the average of the surrounding points' known color values is also larger than the set value, substituting the average value as the known color value of that certain point.

2. The method of claim 1, wherein in the first correcting step, the average known color value of the eight points surrounding the center point having G as the known color, and in the second correcting step, for two points with R as the known color, the average value is $Rl = \frac{1}{4}*(G33+G31+G22+G42)$ and $Rr = \frac{1}{4}*(G33+G35+G24+G44)$; and for two points with B as the known color, the average value method is $Bu = \frac{1}{4}*(G33+G13+G22+G24)$ and $Bd = \frac{1}{4}*(G33+G53+G42+G44)$.

3. The method of claim 2, wherein in the interpolating step, further comprising the sub-steps of:
   calculating the value of R in the center point: $R33 = \frac{1}{2}*(R32+R34) + \frac{1}{4}*(G33-Rl+G33-Rr);$ calculating the value of B in the center point: $B33=\frac{1}{2}*(B23+B43)+\frac{1}{4}*(G33-Bu+G33-Bd)$;

Where:

$R1=\frac{1}{4}*(G33+G31+G22+G42)$;

$Rr=\frac{1}{4}*(G33+G35+G24+G44)$;

$Bu=\frac{1}{4}*(G33+G13+G22+G24)$; and $Bd=\frac{1}{4}*(G33+G53+G42+G44)$; and

Where $R_{ij}$, $G_{ij}$ and $B_{ij}$ are points with known color values from a 5×5 Bayer matrix, and $1 < i$ and $j \leq 5$, with i and j being integers.

* * * * *